Figure 1:
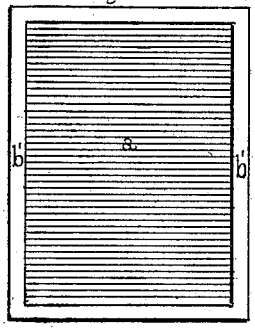

2 Sheets—Sheet 1.
B. DAY.
Printing-Film.
No. 214,493. Patented April 22, 1879.

Fig. 7. STRAIGHT LINING. 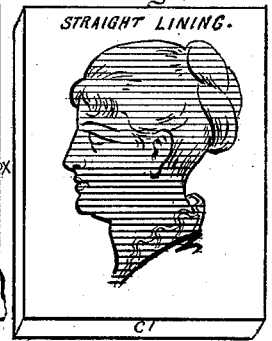
Fig. 8. SWELLED LINING. 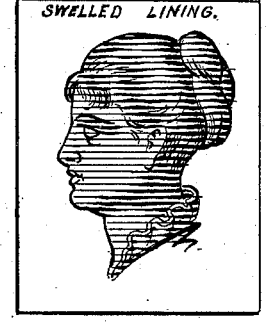
Fig. 9. WAVED LINING. 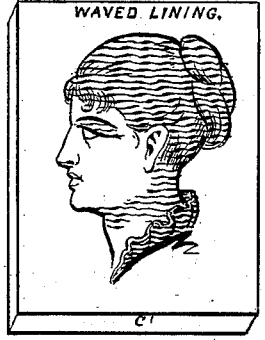
Fig. 10. CROSS HATCHING. 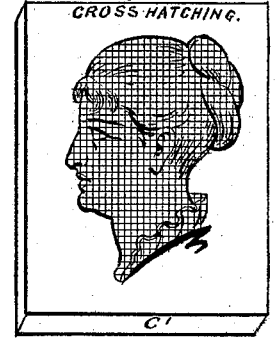
WITNESSES:
C. Sedgwick
Alex F. Roberts
INVENTOR:
B. Day
BY Munn & Co.
ATTORNEYS.

B. DAY.
Printing-Film.
No. 214,493.  Patented April 22, 1879.
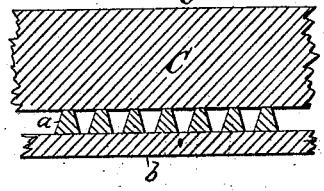
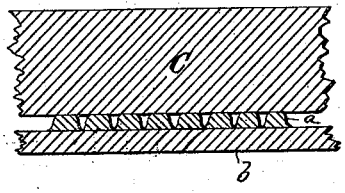
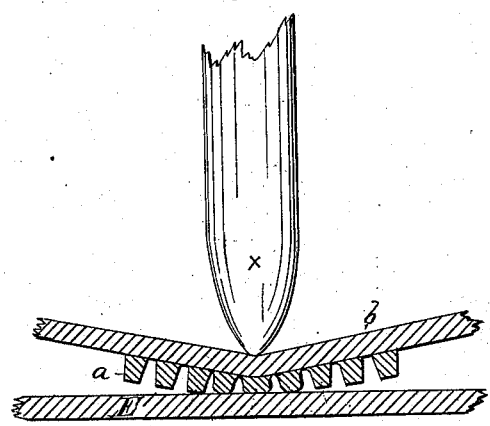
Witnesses.  Inventor.

UNITED STATES PATENT OFFICE.

BENJAMIN DAY, OF WEST HOBOKEN, NEW JERSEY.

IMPROVEMENT IN PRINTING-FILMS.

Specification forming part of Letters Patent No. 214,493, dated April 22, 1879; application filed January 4, 1878.

*To all whom it may concern:*

Be it known that I, BENJAMIN DAY, of West Hoboken, in the county of Hudson and State of New Jersey, have invented a new and useful Improvement in Printing-Films; and I do hereby declare that the following is a full, clear, and exact description of the same.

This invention relates to certain new and useful pellicles, which I denominate "flexible printing-films," designed for use for artistic and decorative purposes; also for printing and the preparation and finishing of drawings, printing and copying surfaces, &c., as will be hereinafter more fully described.

I will describe the method of producing an example of my said printing-films, such example to cover a superficial area of, say, forty-eight square inches, being a film six inches wide and eight inches long.

I first cause to be prepared or engraved upon wood, metal, or other suitable material a series of the lines that are to be copied or reproduced upon the face of my film; or a form of type is set up in the usual manner, if type are to be reproduced upon my film. From this block or engraving or form of type I take an impression by means of a press, or pressure, or electrotype, or matrix, in any suitable substance, but preferably in thin foil of metal, such as tin-foil, which matrix I support upon an even surface, such as a plate of metal or glass, which is to be warmed to a temperature from 100° to 200° Fahrenheit. I then pour upon the warm matrix a warm solution of fine glue or gelatine and glycerine in water.

For a film of the dimensions before mentioned, one-eighth of an ounce of glue or of gelatine is thoroughly dissolved in, say, two ounces of water, or enough water to form an easily-flowing mixture, and to this mixture I add one-twenty-fourth part of an ounce of of glycerine, and the whole is stirred together, when it is ready for use.

After pouring the mixture upon the matrix the latter is allowed to stand, the heat before mentioned being maintained until nearly all the water contained in the gelatine has been evaporated or the mixture has become set. I then place upon the surface of the mixture a backing consisting of any suitable substance, but preferably a sheet of light white silk, the back of which silk I dampen with hot water by means of a cloth or sponge. I then subject the matrix film and back to a suitable degree of pressure in a warm-press until the backing has become equally and firmly cemented to the film. I then remove the whole from the press, and on stripping the film from the matrix the film is completed and ready for use.

My improved film thus made possesses the following properties: First, its face is provided with a printing-surface similar to the original block or type from which the matrix was taken; second, the face of the film is of such a texture that it readily receives colors from rollers or pads, such as printing-inks or other colors; third, the film is flexible, and the lines upon its face are elastic; fourth, the film and its backing are nearly transparent.

Having thus described one example of the ways or methods of producing my printing-films, I wish it to be understood that I do not limit or confine myself to the exact methods of preparation here mentioned, as they may be varied without departing from my invention; but I prefer, from experience, to follow the method described.

Whatever material is used for the face of the film, it should be of such a nature that films having face or printing lines of greater or less yieldingness or elasticity can be readily produced. On this account gelatine is especially useful, because its degree of yieldingness may be varied by increasing or diminishing the quantity of glycerine used in the mixture.

For the backing, while I prefer silk on account of its transparency, tenacity, and flexibility, any other suitable textile fabric or other material may be used, such as fine linen, lawn, lace, paper, collodion, or other transparent flexible substance.

Having thus described one method of preparing my improved flexible printing-films, I will now set forth some of the methods of using the same.

Figure 2:
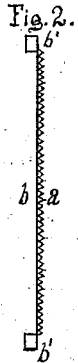
Figure 3:
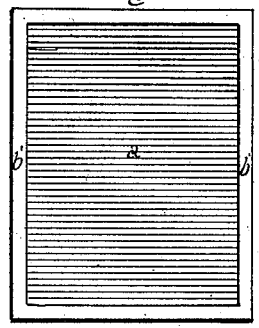

Referring to the drawings, in which the same letters of reference indicate similar parts, Figure 1 is a front elevation of one of my flexible printing-films as prepared in readiness for use, *a* being the gelatine portion of the film, and *b*, Fig. 2, the silk backing; *b'*, a supporting-frame. Fig. 2 is a cross-sectional elevation of the same. Fig. 3 is a front elevation of one of my improved films, the face of which, $a$, is prepared with straight lines, which have been rolled and blocked ready for use with an ordinary printing-ink roller.

Figure 4:

In Fig. 4, $c$ represents the outline of a picture drawn in the usual way by hand upon stone $c'$ or other suitable material, upon which outline picture my films are to be applied in finishing said picture.

Figure 5:
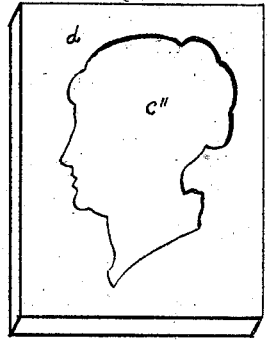

In Fig. 5, $d$ represents a bearer or frisket of paper, with openings $c''$ corresponding to the outline $c$ of the picture in Fig. 4.

Fig. 11 represents, in enlarged detail, the film taking ink from the roller C. Fig. 12 is a similar view, showing the same operation with an increased pressure of the roller, so as to press down the elastic printing-surfaces and ink the sides thereof, as well as the faces, to adapt the film to the making of broader lines. Fig. 13 is an enlarged detail view, showing how the printing-surfaces act under the pressure of the stylus.

Figure 6:
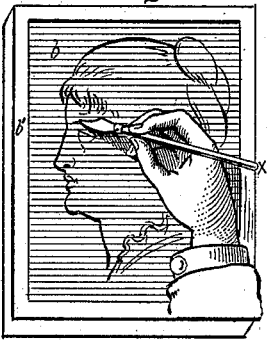

In using my films I place the bearer $d$ upon the picture $c$, and then place the film $a\ b$ upon the bearer $d$, the film-face $a$ downward, in which position the outline of the picture is visible through the transparent back $b$ of the film, as shown in Fig. 6. The interposed bearer $d$ prevents the inked lines of the film $a$ from touching the picture $c$; but when I desire to line or shade the picture I apply pressure to the back of the film $b$ by means of a stylus or other instrument of any suitable form, as shown in Fig. 6, and by giving a single lateral sweep of the stylus $x$ (being guided by the outline of the picture seen through the film-back) I produce a series of light horizontal shade-lines upon the picture, as shown in the upper part of Fig. 7. By giving increased pressure with the stylus, the lines of the film are broadened, and I produce heavier lines, as shown in the lower part of Fig. 7. By giving alternating light and heavy pressure with the stylus, swelled lines are produced, as shown in Fig. 8. By giving a sidewise pressure or side push to the stylus, I produce wave-lines, as shown in Fig. 9.

Thus, by means of one and the same film, by simply varying the degree and direction of pressure with the stylus upon such parts of the film as I desire, I instantly produce light or heavy lines, or swelled or waved shading-lines, or varying combinations thereof, as desired. To produce such lines accurately by hand-drawing in the usual manner by any species of drawing-instrument, or by means of graving-tools in wood-engraving or other engraving, is a work of difficulty, involving much labor and the exercise of peculiar skill, as each line must be worked out separately, care taken not to interrupt its continuity, and yet impart a free and graceful form to the line.

By means of my improvement I am enabled to produce these lines with the utmost rapidity and certainty upon whatever part of the picture I may desire.

By now changing the position of the film upon the bearer, so that the lines of the film-face will stand at an angle to those made upon the picture—for example, those in Fig. 7—and again pressing upon the back of the film with the stylus, I produce cross-lined shading or hatching, as shown in Fig. 10.

To execute good cross lining or hatching, either in drawing or engraving by hand in the usual manner, is one of the most difficult, laborious, and expensive operations known to the artist; but, by means of my improved films, the artist is enabled to execute the finest and most beautiful species of straight-lining, swelled lining, waved lining, and cross lining or hatching with greater rapidity, doing in one hour's time, by means of my improvements, an amount of work that would require a month's labor if executed in the usual manner.

It will be understood that by the use of a single film, $a$, the face of which is provided with simple straight lines, I am enabled to shade up drawings having a very great variety of linings, cross-hatchings, &c.

It will also be understood that when several different films are used, each cast with a different face or different character of lines, grain, or stipple, then a still greater variety of finish may be given to the picture; and, in fact, any kind of stippling, graining, hatching, lining, or shading may be produced upon the picture with the utmost precision, rapidity, delicacy, and excellence of finish, thus effecting a vast saving in time and labor in the production of difficult artistic work.

Several films of different colors may also be successively used, so as to produce corresponding prints in colors. By the use of films that are provided with lines of different forms or fineness, a great variety of tints may be imparted to the picture.

When desired, the outline of the picture may be drawn upon the back of the film, or an outline on tracing-paper may be applied to the back of the film as a guide to the eye in manipulating the stylus.

If I wish to produce a flat tint on the picture, I cut a stencil in paper and place it upon those portions of the picture which I wish to protect from such tint, and I then press upon the back of the film with a flat or hand stylus or instrument or a flat elastic block, by which pressure a flat tint will be given to such parts of the picture as were not covered by the protecting-stencil.

If I wish to produce tinted figures or patterns upon the picture of deeper tone than other portions, I provide a flat stylus or pressing-instrument of any suitable material, the face of which has been made or cut to correspond with the desired form of the tinted figure that is to be made on the picture, and press with such instrument upon the back of the film, and thereby produce a flat-tinted figure upon the picture of deeper tone than the surrounding tints.

One of the peculiarities of my said film is that the most fine and delicate impressions or prints, as well as the strongest and boldest lines, may be thereby produced, and that such prints may be made, not only upon flat surfaces and various materials, such as paper, wood, metal, stone, ivory, and glass, but also upon curved or irregular surfaces of every description of the same or other materials.

My said films are also very durable, and their faces may be replenished with suitable ink or coloring-matter, and repeatedly used whenever required.

My improved flexible printing-films may also be used for ordinary letter-press printing, and for the simultaneous printing of both sides of a sheet of paper; but as this method of printing is to form the subject of another patent, I will not here describe it.

Another of the useful results of this invention, to be also described in one of my other applications for patent, is the quick and rapid production of printing and copying surfaces for lithographic printing and the production of etched blocks for printing, and of copying-surfaces for the making of printing-blocks by photographic agency.

I am aware of the processes described in English Patents Nos. 2,844 of 1867, 109 of 1871, and 2,538 of 1871; but these do not show a thin, tough, and transparent printing-film like mine, nor the process of producing the impression by the abrasive action of a stylus upon the back of the film; and I therefore fully disclaim the devices and methods described in said patents.

Having thus described my invention, I claim as new and desire to secure by Letters Patent—

1. A transparent tinting or printing film, formed with an elastic face in relief and a smooth backing of woven fabric, the said film being made thin, so as to permit an impression to be taken therefrom by the abrasive action of a stylus on its back, as set forth.

2. The method of lining, shading, stippling, hatching, graining, printing, or tinting pictures or other objects in one or more colors, which consists in applying an abrasive pressure to the back of a printing-film having an inked printing-face in relief, as set forth.

3. The method of forming light or heavy, straight, swelled, or wavy lines, stipples, or grains, and combinations thereof, which consists in applying a variable pressure by the abrasive action of a stylus or other implement to the back of a printing-film having elastic or yielding printing-faces, substantially as described.

BENJAMIN DAY.

Witnesses:
 JOSEPH GUTMAN, Jr.,
 JOHN A. PEARY.